United States Patent [19]

Magdaleno

[11] Patent Number: 5,439,396

[45] Date of Patent: Aug. 8, 1995

[54] ADAPTER FOR CIRCUIT BREAKER AND ASSEMBLAGE THEREOF

[75] Inventor: Jose L. Magdaleno, Dallas, Tex.

[73] Assignee: AT&T Corp., Murray Hill, N.J.

[21] Appl. No.: 127,852

[22] Filed: Sep. 28, 1993

[51] Int. Cl.$^6$ .............................................. H01R 9/26
[52] U.S. Cl. .................................... 439/716; 439/936; 361/673
[58] Field of Search ............... 439/722, 736, 716, 626, 439/622; 200/51 R; 361/637, 639, 640, 673

[56] References Cited

U.S. PATENT DOCUMENTS

| | | | |
|---|---|---|---|
| 2,440,824 | 5/1948 | Jackson | 200/51 R X |
| 3,155,882 | 11/1964 | Casey | 439/722 X |
| 4,767,339 | 8/1988 | Comerci | 439/716 OR |
| 4,781,608 | 11/1988 | Hillman | 439/716 X |
| 5,001,315 | 3/1991 | Runyan et al. | 361/673 X |
| 5,029,789 | 7/1991 | Nourry et al. | 361/673 X |

FOREIGN PATENT DOCUMENTS

2128820  5/1984  United Kingdom ................ 439/715

Primary Examiner—Larry I. Schwartz
Assistant Examiner—Daniel Wittels
Attorney, Agent, or Firm—Ruloff F. Kip, Jr.

[57] ABSTRACT

A circuit breaker has ferrule type line and load terminals which clip on to portions of, respectively, input and output current buses for the breaker to permit the breaker by a mere plug-in action to be fastened to those two buses. The output current bus is provided by an adapter comprising a molded plastic case having at its top a receptacle for an end lug on a cable for distributing current from the breaker to a load, and having at its bottom a cylindrical metallic contact to which the load terminal of the breaker is or may be clipped. A metallic bus strap extends in the case from that contact to terminal means in the receptacle for connecting the upper end of the strap to such lug. The case has formed on the outside thereof a horizontal guideway into which the input current bus may be slid to thereupon be held insulated from, and fixedly fastened with, the output current bus strap in the adapter.

9 Claims, 6 Drawing Sheets

ADAPTER FOR CIRCUIT BREAKER AND ASSEMBLAGE THEREOF

FIELD OF THE INVENTION

This invention relates m means for transferring electric power from a source to a load and, for selectively interrupting such transfer of power.

BACKGROUND OF THE INVENTION

In telephone network central offices and other places served by electricity, electric power is supplied m equipment energized thereby through circuit protection boards comprising circuit breakers and current conductors between which such circuit breakers am coupled to be interposed by such conductors between a power source and the electrical load provided by such equipment. Customarily, the circuit breakers were connected to such conductors by the time consuming and labor intensive (and thus costly) practice of bolting the terminals of the breakers and the conductors together. More recently, them have come into use circuit protection boards in which, as an alternative to bolting, the circuit breaker terminals and the mentioned conductors am cooperable to permit the incorporation of a circuit breaker into the board by, in effect, merely plugging in the breaker. Up to now, however, a problem in the use of such plug-in technique has been that, in the event of an inrush of current to the circuit breaker caused by a short circuit in the load, the heat generated at the place of contact between the circuit breaker and the input conductor has not been dissipated as efficiently as is desirable so as to cause an unduly high temperature at that place of contact.

An additional problem which has arisen in connection with such circuit boards is that the load terminal of the breaker has been electrically coupled m a cable distributing the current from the breaker to a load by way of a distribution device using custom inserts pressed in a PWB, the PWB having 3 oz. copper paths, a terminal strip and an insulator, solder connecting all three pieces together. However high current caused by a short circuit in the load opens the current path of the PWB distribution device, rendering it useless and requiring costly replacement of the entire device.

SUMMARY OF THE INVENTION

The problem just mentioned has been overcome by an invention of the character set out by the appended claims.

DETAILED DESCRIPTION OF DRAWINGS

For a better understanding of the invention, reference is made to the following description of an exemplary embodiment thereof, and to the accompanying drawings wherein.

In the description which follows, various elements shown in the drawings will be described in terms of horizontal and vertical dimensional coordinates, but it is to be understood that the invention hereof is not, either as disclosed or claimed, limited by any recital herein of its spatial orientation.

DETAILED DESCRIPTION OF EMBODIMENT

Figure 1:
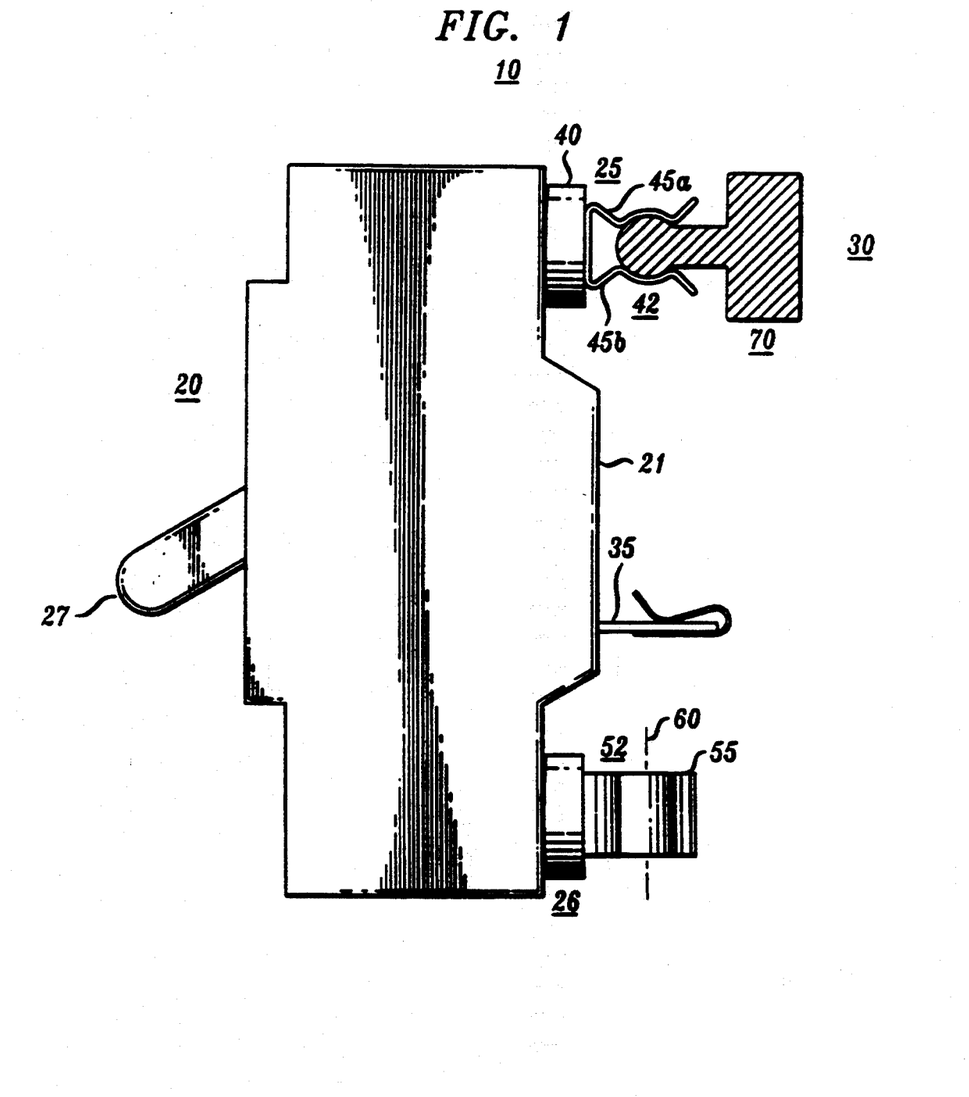
FIG. 1 is a right side elevation view showing schematically the assemblage of a circuit breaker and an input current transfer bus according to the invention, the bus being shown in vertical cross-section taken as indicated by the arrows 1—1 in FIG. 4.

Referring to FIG. 1, the reference numeral 10 designates an assemblage for selectively interrupting transfer of electric current. Assemblage 10 comprises a circuit breaker 20 and a bus 30 for supplying electric current to breaker 20 from a current source which may be, for example without restriction, a battery plant.

The circuit breaker 20 has a plastic housing 21, an upper or "line" terminal 25 for receiving current via bus 30 from the mentioned source, and a lower or "load" terminal 26 for transmitting electric current passing through the breaker to an electric load comprising equipment energized by electric power and serviced by breaker 20.

Breaker 20 also includes an angularly movable push button 27 connected to a switch (not shown) in the breaker's interior. Button 27 is manually movable between a down or "off position" and an up or "on position" at which such switch opens and closes, respectively, in a current path in the breaker between terminals 25 and 26 to thereby interrupt and restore, respectively, flow through the breaker of current from bus 30. In the event a short circuit develops in the electrical load served by the breaker, the resulting inrush of current from bus 30 through the breaker actuates conventional mechanism therein (not shown) which drives the mentioned switch from closed to open position (and concurrently, push button 27 from up to down position) so as to interrupt the current flow through breaker 20 until such switch is reclosed by resetting of button 27.

The breaker 20 also includes an alarm device 35 which produces an audible or visual alarm upon occurrence of a short circuit in the circuit breaker load.

Figure 2:
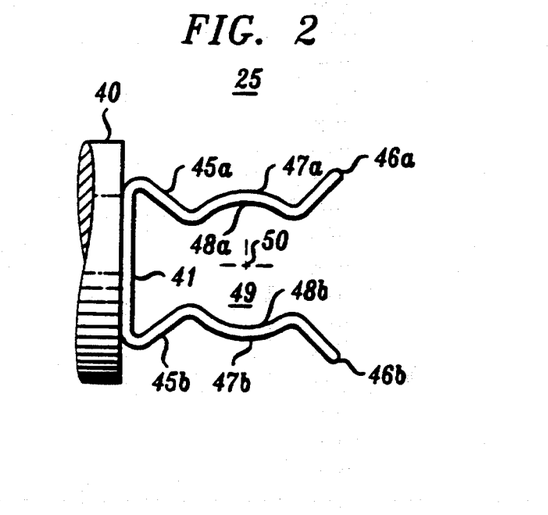
FIG. 2 is an enlarged right side elevation view of the upper terminal of the FIG. 1 circuit breaker.

Referring now to FIG. 2, the upper or "line" terminal 25 is of a type known as a "ferrule" terminal. Terminal 25 comprises a metallic cylindrical base 40 extending leftward inside housing 21 to the breaker mechanism therein, and projecting rightward out through an aperture in the housing. The front end of base 40 has thereon the shank portion 41 of a copper clip 42 fixedly joined to the base as, say, by a rivet (not shown) passing through the shank 41 into the base 40.

Other portions of clip 42 are a pair of vertically spaced resilient metallic terminal strips 45a, 45b integrally joined to vertically opposite ends of the clip shank 41 and extending from such joinders horizontally away from the housing 21 of the circuit breaker 20. At an intermediate location in their horizontal extents, the strips have formed therein, near their free ends 46, respective bow-shaped bends or inflections 47a, 47b, beyond which the strips flare outwardly from each other to those free ends. The inflections 47 are disposed vertically opposite each other, project away from each other and have respective inner surfaces 48a, 48b bounding opposite sides of a receptacle space or cavity 49 defined between the strips 45 and having an axis 50. Such axis is, in the case of upper terminal 25, a horizontal axis normal to the horizontal extent of the terminal strips 45. The inner surfaces 48 of the inflections 47 are preferably circular cylindrical surfaces which conform to surface areas of a geometric circular cylinder containing cavity 49 and having axis 50 as its axis.

The lower load terminal 26 of breaker 20 is a ferrule terminal similar in construction to the upper terminal 25 except that, in the lower terminal, the clip 52 is rotated 90° in relation to the corresponding clip 42 in terminal 25. The result is that the terminal strips 55 of terminal 26 are spaced apart horizontally so that the receptacle space defined between those strips has a vertical axis 60.

Figure 3:
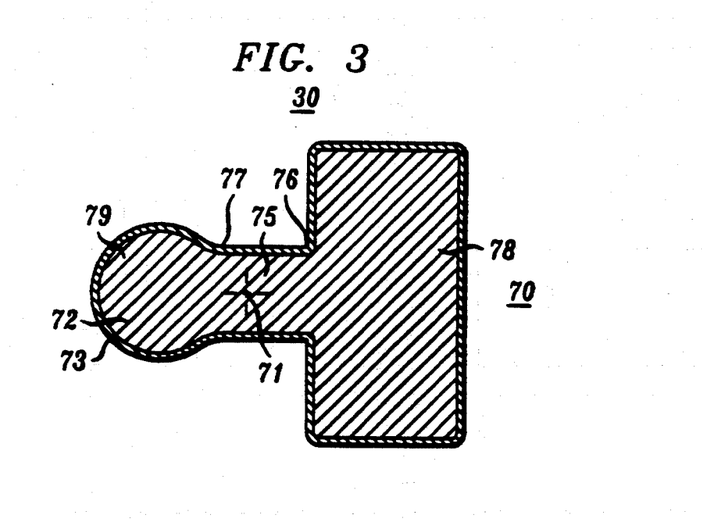
FIG. 3 is an enlarged view of the cross-section shown in FIG. 1 of the input current transfer bus.
Figure 4:
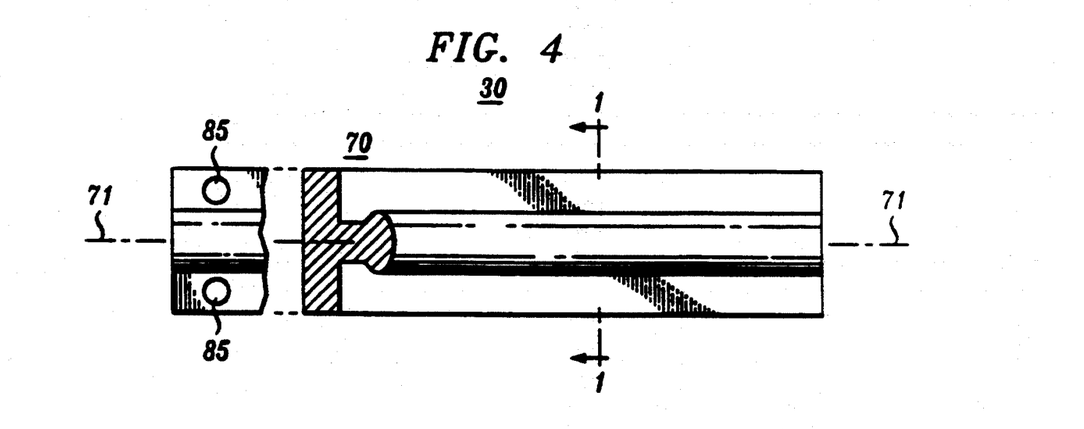
FIG. 4 is a front elevation of the FIG. 1 bus, shown as being partly broken away, with a cross-section on the diagonal being taken through that bus at the break away location.

Coming now to the current transfer bus 30, shown standing alone in FIGS. 3 and 4, such bus comprises an elongated linear metallic extruded rigid rail 70 having a lengthwise horizontal or "longitudinal" axis 71 along which the rail extends. Axis 71 is parallel with the cavity axis 50 (FIG. 2) when the bus is assembled (FIG. 1) with the circuit breaker 20. The rail in its interior is (FIG. 3) constituted solidly of copper 72 but has on its outside a coating 73 (FIG. 3) of an antioxidant material such as a tin solder coating.

Structurally speaking, the rail 70 comprises an elongated horizontal web 75 having rear and front margins 76 and 77 on horizontally opposite sides of axis 71, and having also rear and front vertical flanges 78 and 79 integrally joined with the web 75 at, respectively, the rear margin 76 and the front margin 77 of the web. The rear flange 78 is rectangular in vertical cross-section and is salient in both of the vertical directions (i.e., the "up" and "down" directions) away from the web 75 with which it is joined, and can aptly be described as a "flat" (albeit thick) web. In contrast, the front flange 79 has in vertical planes a cross-sectional shape which is rounded in outline and protuberant in both vertical directions away from web 75. That is, the front flange 79 and the front part of web 75 in vertical cross-section have a bulbous shape.

The entire rail, 70 consisting of web 75 and flanges 78, 79 has an exterior circumferential surface which is a cylindrical surface, formed about axis 71, so that the rail is constant in size and shape in vertical cross section over the horizontal length of the rail. That cylindrical surface is, for the most part, noncircular but the portion of that surface which forms the exterior of front flange 79 is preferably a circular cylindrical surface 80 having the same radius as the circular cylindrical inner surfaces 48 of the terminal strips 45 of circuit breaker terminal 25.

Continuing with a comparison of the rail's rear and front flanges 78 and 79, it will be noted that the vertical cross section of that rear flange has a substantially greater area than that of the front flange to thereby contain much more mass per unit length of rail than does the front flange. One of the ways in which rear flange 78 accommodates more mass than per unit length than does the front flange 79 is that the rear flange has a greater vertical dimension than does the front flange. Moreover, proportioning the design of the rear flange relative to that of the front flange in the direction of increasing the vertical dimension of flange 78 in relation to flange 79 provides the additional advantage that, assuming that for some reason it is necessary for the mass per unit length in flange 78 to be maintained in fixed proportion to the mass per unit length in flange 79, nonetheless, by increasing the vertical dimension of flange 78 while concurrently shrinking its horizontal thickness to maintain constant its mass per unit length, it is possible to increase as desired the surface area per unit length of flange 78 relative to its mass per unit length. To so increase the surface area of flange 78 is advantageous as later discussed. That the surface area per unit length of flange 78 can be increased as desired relative to its mass per unit rail length (here, for convenience, assumed constant) flows from the geometric consideration that, in the case of a cylindrical body (and flange 78 is a cylindrical body) the minimum ratio for the circumferential surface area to the volume of the body is obtained when the body is a circular cylindrical body, and the value of that ratio increase as one departs from that cylindrical shape to its being one in the form of a very thin cylindrical shell having an infinitesimal thickness between opposite sides of the shell.

Referring to FIG. 4, the rail 70 at its left hand end has vertical holes 85 formed in its rear flange 78 on opposite sides of the web 75. The holes 85 are for passage therethrough of bolts (not shown) for connecting the rail to, say, an end lug on a cable leading to the source (as, say, a battery plant) from which the rail draws its current. Other means (not shown) may be employed to provide a connection between rail 70 and that source.

Returning now to the assemblage shown in FIG. 1, assume that initially the circuit breaker 20 and bus 30 are horizontally spaced with the bus 30 being held stationary in relation to a circuit protection board (not shown) with which the elements 20, 30 are associated. To create the assemblage 20, 30 the breaker 20 is moved rightward to cause the flange 79 of rail 70 to be relatively forced leftward through the flaring entrance of the circuit breaker's line terminal 25 and to become lodged in the cavity 49 between the resilient terminal strips of that terminal. When the rail flange 79 becomes so lodged, the terminal strips press against it from opposite sides, and since the circular cylindrical outside surface of the flange has the same radius as the circular cylindrical inner surfaces 48 of the inflections 47 formed in the terminal strips 45, those inner surfaces over their arcuate extents make areal contact with the opposite sides of the flange 79.

The areal contacts under pressure between the strips 47 and the rail flange 79 serve both to electromechanically connect the whole rail 70 to the circuit breaker terminal 25 and to retain that upper terminal mechanically clipped to the rail 70. Concurrently, the resilient metallic terminal strips 55 of the lower circuit breaker terminal 26 make areal contacts under pressure with opposite sides of a short round vertical metallic cylindrical contact, later described in more detail so as, by such areal pressure contacts, both to electromechanically connect the lower breaker terminal to that contact and to retain the lower terminal clipped to such contact. In this wise, the circuit breaker 20 is "plugged in" to the mentioned board.

So long as there is no short circuit in the load served by breaker 20, electric current supplied to the breaker 30 passes uninterruptedly through the breaker to the load. The occurrence, however, of such a short circuit produces an inrush of current from the bus into the breaker and a resulting opening of the breaker which remains open until the short circuit has been removed and the breaker has been reset.

A consequence of such inrush is that a great deal of heat is generated at and in the vicinity of the contacts made between the strips 45 of breaker terminal 25 and the portion of the bus 30 occupying the receptacle 49 defined between those strips. Prior to the invention hereof, the bus took the form of an elongated circular cylindrical rod having the same radius as the circular cylindrical inner surfaces of the strips 45. When, however, the bus had such rod form, the rod was relatively small in cross section and extended from the breaker terminal 25 only in the lengthwise direction through the terminal strips. The previous rod shaped bus afforded very little mass to serve as a heat sink for the mentioned heat and, moreover, afforded a path for dissipation of such heat only in the rod's horizontal lengthwise or "longitudinal" direction.

In contrast, the bus 30 comprising the rail 70 disclosed herein has a mass per unit length which, because of the presence of its web 75 and rear flange 78 in addition to its front flange 79 (the pan of rail 70 analogous to the prior circular rod bus), is substantially greater than that of the earlier used bus and can be increased indefinitely by merely adding to the mass per unit length of the rear flange 78. Further, heat generated at and in the vicinity of the contacts made between the terminal strips 45 and the bus can now flow from where the heat is first generated not only in the longitudinal direction through the bus but also in the case of rail 70, in the other or "transverse" horizontal direction from front flange 79 through web 75 to web 78 and the large mass provided thereby. A still further factor in improving the dissipation of heat away from its place of generation at and near the contacts between breaker terminal 25 and the bus, is that rail 70 has much greater surface area per unit length than did the earlier rod shaped bus to thereby provide better dissipation of such heat by its radiation into the atmosphere and, as earlier discussed, such surface area of the rail can be increased as desired by modifying the design of its rear flange 78 to make it progressively thinner in relation to a fixed area in vertical cross-section of the flange.

Because the described rail 70 is a much more efficient heat dissipator, for all the reasons set out above, then was the earlier rod shaped bus, the use of rail 70 in the FIG. 1 assemblage in place of that earlier bus serves to keep at an acceptably low value the temperature generated at the line terminal 25 of the breaker 20 in the presence of a short circuit in the load served the by breaker. To put it another way, when it is given as a requirement that the temperature generated at such line terminal must not exceed a pre-established value (and such is a requirement in the commercial design of circuit protection boards) then the use of a bus having the configuration of rail 70, rather than the earlier circular rod configuration, permits a line terminal of given size for a circuit breaker to receive a much greater amperage of inrush current while still meeting such requirement.

In general, moreover, the size of circuit breakers as a whole are in proportion to the size of their terminals. It follows that, when input current buses of the configuration of rail 70 are used in circuit protection boards in place of the earlier circular rod buses it is a fact, as a general proposition and by redesign of the circuit breakers, that the short circuit amperage handled by the circuit breakers can be increased for each from, say, 30 amperes to, say, 100 amperes without having to increase the size of the breaker. In those same circumstances, it is conversely the fact, as a general proposition and by redesign of the circuit breakers, that if the short circuit amperage to be handled by the circuit breakers plugged into the board has an upper value such as, say, 30 amperes, then, by use of input current buses having the configuration of rail 70 rather than the former circular rod configuration, the size of the circuit breakers needed for the board can be reduced, say, three fold.

Figure 5:
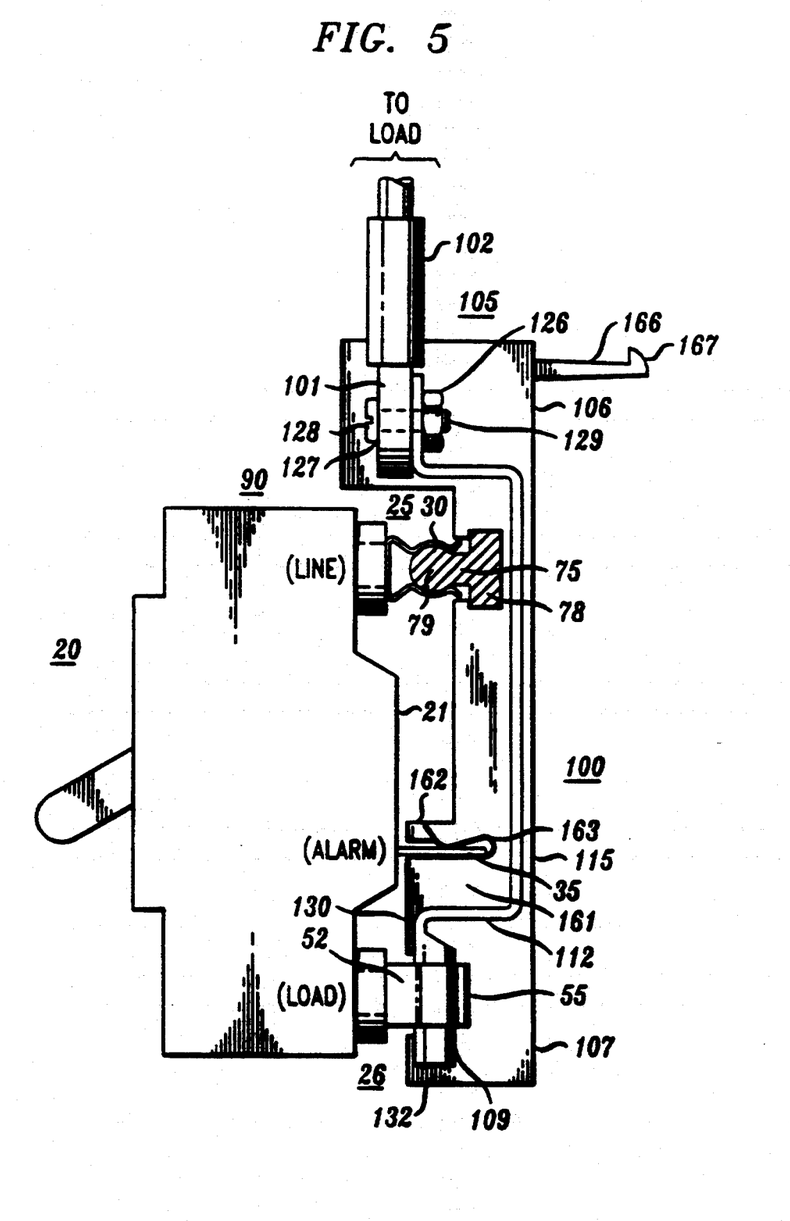
FIG. 5 is a right side schematic elevation o the FIG. 1 assemblage as supplemented by the addition to the assemblage of an adapter which comprises a molded plastic case and a metallic mold insert in the case for effecting electrical connection between the load terminal of the circuit breaker and an end lug on a cable for distributing current from the breaker to a load.

Referring now to FIG. 5, the assemblage shown therein is different from the assemblage 10 of FIG. 1 by virtue of being more complete and is, therefore, designated by the different reference numeral 90.

The assemblage 90 includes an adapter 100 for effecting electrical connection between the load terminal of breaker 20 and a metallic end lug 101 on a cabled 102 distributing current from breaker 20 to electrical equipment (not shown), constituting an electrical load served and protected by the breaker 20. Adapter 100 is a plastic molded part comprising a rigid vertically extending plastic case 105 constituted of plastic material 104 (FIG. 7) and having first and second vertically spaced portions 106 and 107 provided as the upper and lower ends of the case. Case 105 is molded around a stamped rigid copper mold insert 108 (FIG. 8) comprising a metallic cylindrical contact 109 and a rigid metallic output current bus strap 110 vertically extending between first and second strap ends 111, 112 at the locations of, respectively, the mentioned first and second portions 106 and 107 (FIG. 5) of the case 105. Strap 110 is joined (FIG. 8) at its end 112 to contact 109 by a metallic neck 113 which provides an electrical connection between the strap and the contact. Elements 109 and 113 are other parts of mold insert 108. Contact 109 has thereon a coating of antioxidant material (not shown) similar to the coating 73 on rail 70.

Figure 6:
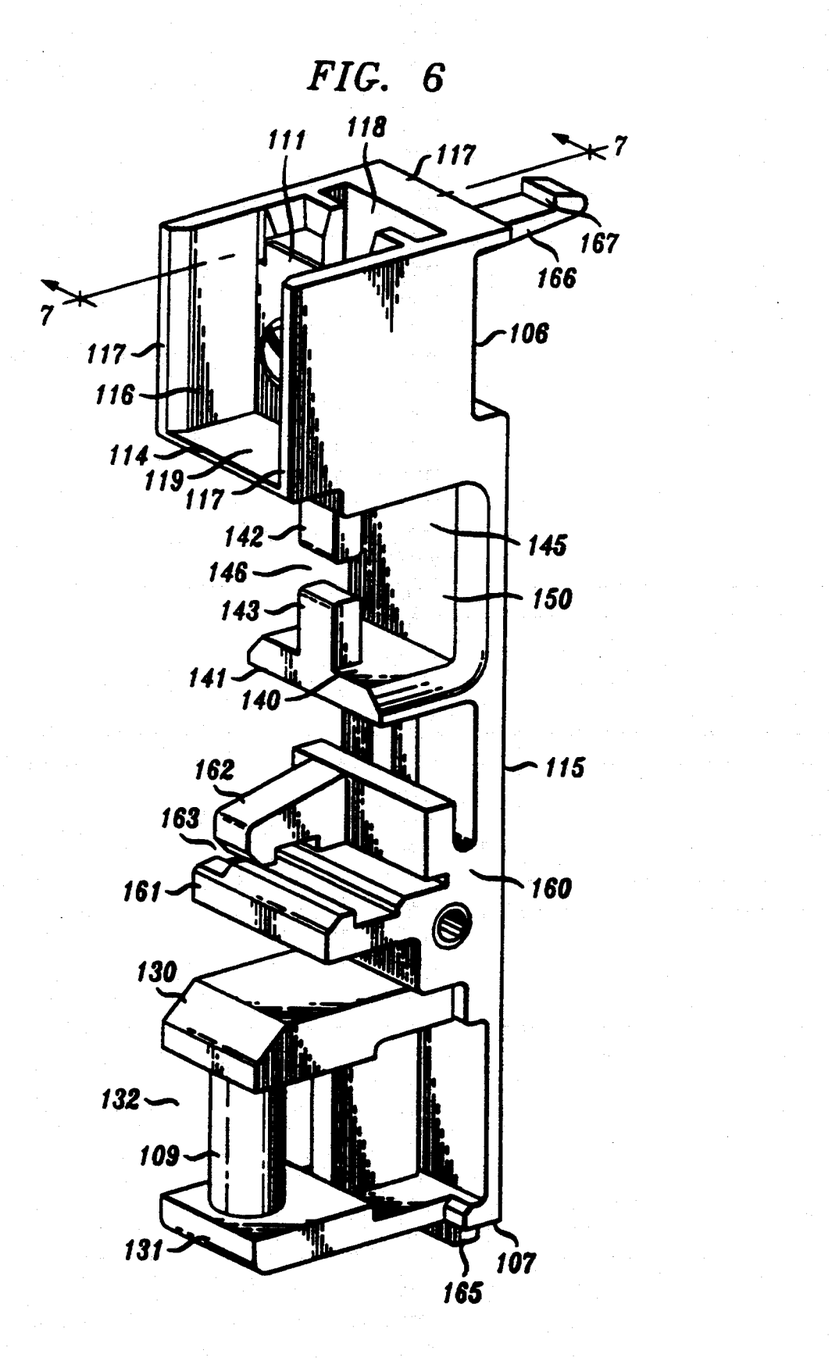
FIG. 6 is an isometric view of the adapter shown in FIG. 6.
Figure 7:
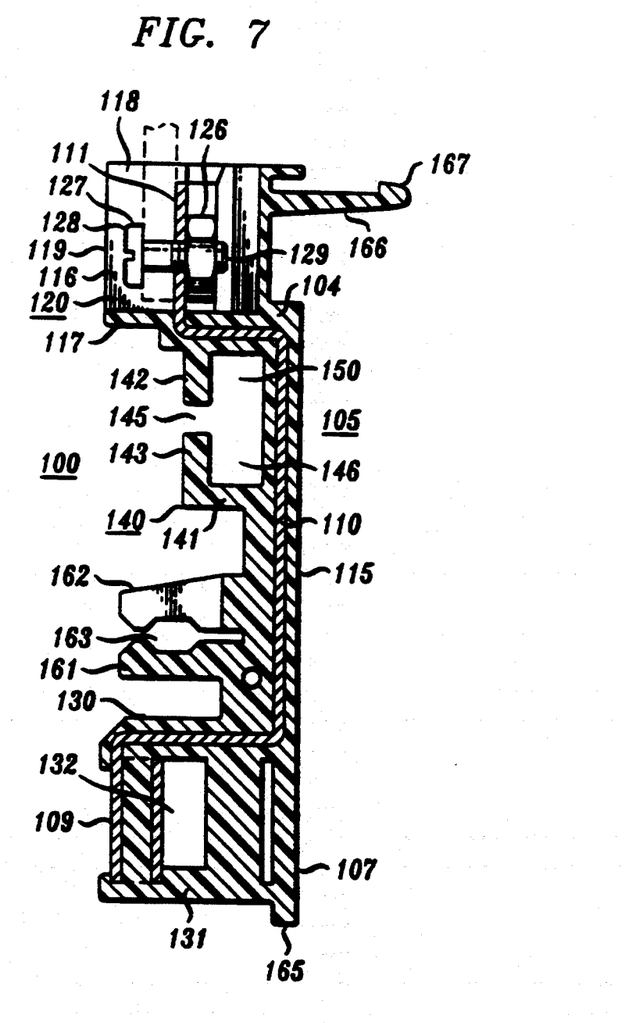
FIG. 7 is a right side elevation of a cross-section of the FIG. 6 adapter, such cross-section being taken through the central vertical plane of the adapter, as indicated by the arrows 7—7 in FIG. 6.
Figure 8:
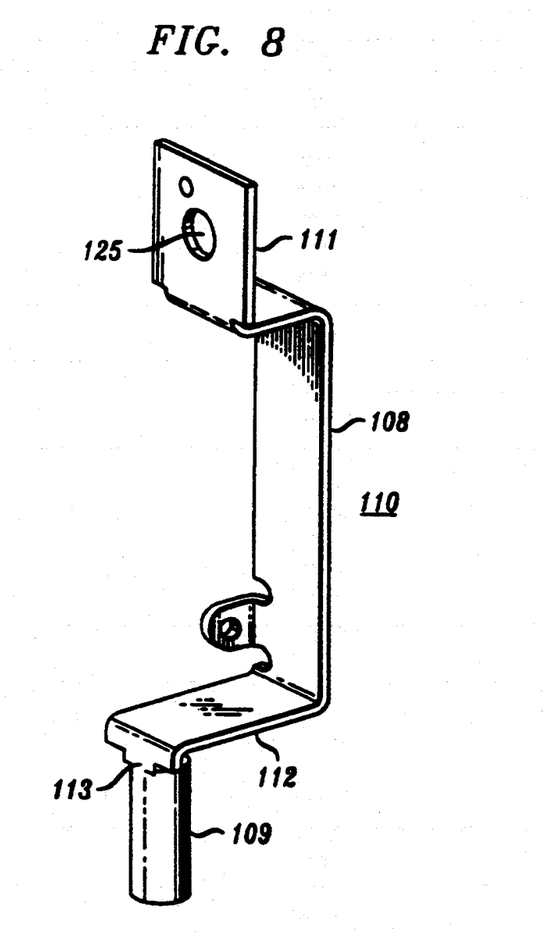
FIG. 8 mold is an isometric view of the metallic mold insert included in the FIG. 6 adapter.

Referring now to FIGS. 6 and 7, the plastic case 105 comprises, as a major structural part thereof, a vertically extending bar-shaped main body 115. The case at its upper end has a plastic receptacle 116 formed by the case and integral with that main body and into which projects the end 111 of strap 110. Within receptacle 116, the strap end 111 is bare, i.e., its metal is exposed. Receptacle 116 is enclosed (a) at its bottom by the top of a forwardly jutting shelf 114 and (b) around most of its circumference by walls 117 formed by the plastic material 104 of the case. The receptacle 116 has, however, an end opening 118 at its top and a circumferential opening 119 at the front of the receptacle. End opening 118 is for insertion into the receptacle of the lug 101 on cable 102, and front opening 119 is for insertion in the horizontal direction into the receptacle of a screwdrive tool (not shown) for purposes of adjusting an adjustable terminal means 120 (FIG. 7) contained in receptacle 116 for the purpose of electrically connecting lug 101 and strap end 111.

The terminal means 120 comprises the bare strap end 111, a circular hole 125 (FIG. 8) formed in that strap end 111, a nut 126 (FIG. 5) lying on the back side of that strap and having therein a threaded hole coaxial with hole 125, and a screw 127. The screw 127 comprises a slotted head 128 spaced away from strap end 111 towards receptacle opening 119 and, also, a threaded stem 129 (FIGS. 5 and 7) extending from head 128 through hole 125 in strap end 111 and into the threaded hole in nut 126. In the use of the adapter 100, the lug 101 is inserted through the top opening 118 in receptacle 116 and into the space behind screw head 128 to be disposed between it and strap end 111 and to straddle the stem 129. Screw 127 is then turned by the mentioned screwdriver to grip lug 101 between screw head 128 and the strap end to thereby produce direct electromechanical contact between the lug and strap end 111. Subsequent turning of the screw in the opposite direction will release the lug from such gripping to permit the lug's removal from receptacle 116. The terminal means 120 is, therefore, adapted to selectably electrically couple the lug 101 and the strap 110 or permit de-coupling thereof.

The case 105 at its lower end or "second" portion 107 is formed to provide upper and lower plastic brackets 130 and 131 (FIGS. 6 and 7) integral with, and projecting transversely forward from, main body 115 to extend in assemblage 90 (FIG. 5) towards the breaker 20. Brackets 130, 131 are separated from each other by a vertical gap 132 (FIGS. 6 and 7).

The paired brackets 130 and 131 serve as a mounting for cylindrical contact 109 which is disposed in gap 132 horizontally spaced away from main body 115 of the case, and which contact crosses gap 132 in the vertical direction to extend between opposite ends of the contact received in the plastic material 104 of, respectively, one and the other of the brackets 130 and 131. In the assemblage 90, the contact 109 makes direct electromechanical contact with the ferrule load terminal 26 (FIG. 5) of braker 20 by being clipped to that terminal by its resilient terminal strips 55 in the same way as input current bus 75 makes direct electromechanical contact (FIG. 1) with the terminal 25 of the breaker by being clipped to that terminal by its resilient terminals strips 45 as earlier described herein.

From its bare end 111 in receptacle 116, the strap 110 in case 105 extends (FIG. 7) in case 105 transversely rearward for a short distance and, next, down through the main body 115 of the case to the level of upper bracket 130 and, then, transversely forward through that upper bracket to be electrically connected therein by neck 113 (FIG. 8) to the upper part of cylindrical contact 109. In so extending from receptacle 116 to contact 109, the stage 110 is fully encapsulated, over its length excluding strap end 111, by the plastic material 104 of case 105.

With contact 109 being clipped as described to the load terminal 26 of breaker 20, and with the lug 101 of cable 102 being gripped by terminal means 120 to be in pressure contact with the bare metal of strap end 111, the described adapter 100 establishes and maintains an electrical connection between the lug 101 of the distribution cable 102 and the ferrule type load terminal 26 of the breaker 20. Such an adapter 100 is needed because, if terminal 26 is to have a ferrule structure which, along with the ferrule structure of the terminal 25, permits connection of the breaker to the circuit protection board by mere plugging in of the breaker (as earlier described herein), then the breaker's load terminal 26 cannot simultaneously provide direct anchorage thereto of the lug 101, and yet it is desirable that there be a substantially ohmic connection between the terminal and the lug. The adapter 100 provides that ohmic connection.

Besides so doing, the adapter 100 performs another very useful function now to be described. Specifically, the case 105 is molded to have transversely forward of its main body 115 a segment 140 (FIG. 6) of the case which is all plastic and is integral with body 115, and is formed at its top by the bottom of shelf 114, at its bottom by a lower shelf 141 jutting forward from main body 115, at its back by the plastic material 104 on the front side of main body 115 between the shelves 114 and 141, and, at the front of the segment, by a pair of retainer tabs 142, 143 vertically extending towards each other from, respectively, shelves 114 and 141 and terminating short of meeting each other. By virtue of having such configuration, the segment 140 has formed therein a guideway 150 for passage through the segment in the longitudinal horizontal direction of the input current bus 30. As well shown by FIG. 7, the wall surface areas which bound guideway 150 are constituted entirely of the plastic material 104 of the case. Hence, bus 30 when in guideway 150 (FIG. 5) is in insulated relation from the output current bus strap 110 in the case.

Moreover, the guideway 150 is so sized and shaped that the input current bus 30 has a close fit therein. Specifically, guideway 150 is of a "T" configuration and comprises vertical and horizontal slots 145 and 146 extending longitudinally through segment 140 and corresponding respectively to the rear flange 78 and web 75 of the bus 30. Horizontal slot 146 is disposed between tabs 142, 143 and intersects the vertical central region of vertical slot 145 and extends transversely forward from that intersection to the outside of segment 140.

When bus 30 is slid longitudinally into guideway 150, the flange 78 and web 75 of the bus 30 are seated (FIG. 5) in, respectively, slots 145 and 146 with the front flange 79 of the bus being held outwardly spaced from segment 140 by the web 75 of the bus. The slots 145 and 146 are so matched in their cross-sections in the vertical-transverse plane with the cross-sections in that plane of the flange 78 and web 75 seated therein that the input current bus 30 is held by case 105 in fastened relation with the output current bus bus strap 110 in the case. Such fastened relation is also a fixed relation in that the bus 30 is constrained by its guideway 150 from any substantial movement in the angular coordinates relative to the bus 110. Further, bus 30 is also constrained by its guideway 150 from any substantial movement relative to output current bus strap 110 in all translational coordinates except for the longitudinal coordinate in which the bus 30 must be movable in order to slide it into the guideway. Once, however, bus 30 has been inserted and properly positioned longitudinally in guideway 150, it is constrained against further longitudinal movement relative to adapter 100 by fastening means (not shown). The device 100, therefore, serves not only as an electrical adapter but also as a mechanical fastener for holding the input and output current buses 30 and 110 fixedly positioned relative to each other in all except the longitudinal translational coordinate.

Other features of the adapter 110 are as follows.

Below the segment 140, the case 105 is shaped to have a segment 160 (FIG. 6) projecting forward from the main body 115 of the case and consisting of a lower shelf 161 and an upper stud 162 separated from each other by a crevice 163 extending horizontally inward. The alarm 35 of the breaker 20 extends (FIG. 5) into that crevice to be shielded and protected by the elements 161 and 162 above and below it.

At its lower and upper ends 107 and 106, the case 105 (FIG. 6) has, respectively, a downwardly salient longitudinally extending longitudinal rib 165 and a resilient rearwardly extending finger 166 with a claw 167 at its free end. The elements 165–167 are provided to permit a fastening without the use of any tool of the adapter 100 (and, thus, also of the breaker 20 when clipped by its terminals 25, 6 to adapter 100) to a sheet metal backing panel (not shown) mounted on, say, a wall of the room in which the assemblage 90 is located. The mode of such tool-less fastening of the adapter to that backing panel is that the rib 165 of the adapter is seated in a support groove on the front of the panel, and the finger 166 is then pushed through an opening in the panel until the claw 167 latches with a detent shoulder inside the panel to hold the upper end of the adapter fastened to the panel.

The above described assemblage 90 and adapter 100 being exemplary embodiments of the invention hereof, it is to be understood that additions thereto, omissions therefrom and modifications thereof can be made without departing from the invention. For example, without restriction, although the modification to be now mentioned is not preferred, the input current bus 30 comprising the rear and front flanges 78, 79 and connecting rib 75 can be replaced in the assemblage 90 by the input current bus (earlier described but not shown) of circular cross-section, with the guideway 150 in adapter 100 being correspondingly modified to be of circular cross-section and have a close fit with that bus. In the instance of such replacement, the circular bus will not be restrained by the guideway from angular turning movement about the axis of the bus but will otherwise be constrained from movement in the same way as is the bus 70.

As a further example, without restriction, while in assemblage 90, the cable 102 and lug 101 thereon are connected (FIG. 1) to adapter 100 at a location above breaker 20, there are applications where it is preferable that the cable and lug be connected, at a location below breaker 20 to the adapter to be electronically coupled therethrough to the load terminal 26 of the breaker. For those applications, the adapter 100 is modified as follows. While, the main body 115 of the case 105 extends as before upward from bracket 130 to the top of the case segment 140 so as to provide as before, at the same location on the adapter, the guideway 150 for input current bus 30, the receptacle 116 is shifted from being above breaker 20 (FIG. 5) to be below adapter bracket 131 and be integral with and connected to that bracket by a downward extension of the case's main body 115. Other changes are (a) that the receptacle 116 is turned upside down so that its previous top opening 118 becomes its bottom opening, and (b) the strap 110 inside case 105 is redirected to lead from bracket 130 through that downward extension of the main body so as to have what is now the lower end of the strap project into receptacle 116 and carry the terminal means 120 for connecting the cable lug 101 to the strap. In the case of such modified adapter 100, the cable 102 and lug 101 thereon are, of course, inserted upwardly into the receptacle 116.

Accordingly, the invention is not to be considered as limited save as is consonant with the recitals of the following claims.

I claim:

1. An adapter for effecting electrical connection between a ferrule load terminal of a single pole circuit breaker and a lug on a cable for distributing current from said breaker to a load, said circuit breaker also having a line terminal for receiving current from a source thereof, and said adapter comprising; a rigid plastic case comprising, a vertically extending bar-shaped main body, a plastic receptacle for said lug which is formed by said case at a first end of said body to be integral with said body, a pair of horizontally extending plastic brackets integral with and at the second end of said body and transversely projecting forwardly therefrom, said brackets being spaced to be separated by a gap, a metallic cylindrical contact disposed in said gap horizontally away from said body and crossing said gap to extend between opposite ends of said contact and be received in the plastic of, respectively, one and the other of said brackets, said contact being coupleable to said load terminal by being clipped thereto, a rigid metallic output current bus strap having a strap end projecting into said receptacle and being encapsulated over its length excluding that end by the plastic of said case, said strap extending from that end through said main body and then through one of said brackets to be electrically connected in that bracket with said contact, and adjustable terminal means in said receptacle for electrically coupling therein said lug and strap end.

2. An adapter according to claim 1 in which said receptacle is enclosed by the plastic of said case so as to leave said receptacle with an end opening for insertion into said receptacle of said lug and with, also, a circumferential opening providing access in the horizontal direction into said receptacle for adjustment of said adjustable terminal means.

3. An adapter according to claim 2 in which said circumferential opening in said receptacle is disposed at the front thereof to be transversely forward of said strap end.

4. An adapter according to claim 1 in which said plastic case comprises a plastic segment thereof coupled with said main body, and in which said segment has formed therein a guideway extending through said segment in the lengthwise horizontal direction for passage through said segment in said direction of a rigid elongated input current bus coupleable with said line terminal of said circuit breaker by being clipped thereto.

5. An adapter for effecting electrical connection between the load terminal of a single pole circuit breaker and a lug on a cable for distributing current from said load terminal to a load, said circuit breaker also having a line terminal for receiving current from a source thereof, and said adapter comprising; a molded rigid vertically extending plastic case, a rigid mold insert for said case comprising a rigid metallic output current bus strap having first and second strap ends at the locations of, respectively, first and second vertically spaced portions of said case, said strap extending in said case between said strap ends, and said strap over its length, excluding said first strap end, being encapsulated by the plastic of said case, means at said first portion of said case for electrically connecting said first strap end to said lug, and means at said second portion of said case for electrically connecting said second strap end to said load terminal of said circuit breaker.

6. An adapter according to claim 5 in which said case further comprises means for supporting in insulated relation from said strap and in fastened relation therewith a rigid elongated horizontally extending input current bus coupleable to said line terminal of said breaker for supplying current from said source to said line terminal.

7. A current transfer assemblage comprising, a single pole circuit breaker having a ferrule line terminal and a ferrule load terminal, vertically spaced from each other, for, respectively, receiving current destined for said breaker from a source of said current and supplying said current from said breaker to a load, and an adapter for effecting electrical connection between said load terminal and a lug on a cable for distributing said current from said load terminal to said load, said adapter comprising, a molded rigid plastic case disposed transversely rearward of said breaker and having vertically spaced first and second portions of said case, a mold insert for said case comprising a rigid metallic output current bus strap having first and second strap ends at the locations of, respectively, said first and second portions of said case, said strap extending in said case between said first and second strap ends, and said strap over its length, excluding said first strap end, being encapsulated by the plastic of said case, means at said first portion of said case for electrically connecting said first strap end to said lug, and means at said second portion of said case electrically connecting said second strap end to said load terminal of said circuit breaker.

8. An assemblage according to claim 7 in which said case comprises, a pair of plastic brackets horizontally extending at said second portion of said case towards said breaker, said brackets being separated to be spaced from each other by a gap, and in which said means for electrically connecting said second strap end to said load terminal comprises a metallic cylindrical contact which crosses said gap and is received at opposite ends thereof within the plastic of, respectively, one and the other of said brackets and is electrically connected within one of said brackets to said strap, said contact being clipped to said ferrule load terminal of said breaker to thereby be electrically connected therewith.

9. A assemblage according to claim 7 in which said assemblage further comprises; a rigid elongated input current bus passing in the lengthwise horizontal direction through said ferrule line terminal to be clipped thereto and thereby be electrically connected therewith, and means provided by said case for supporting said input current bus in fastened relation with said strap in said case so as to be insulated from said strap in said case and so as to be constrained against translational movement relative to said case except in said lengthwise horizontal direction.

* * * * *